United States Patent
Caminiti et al.

(10) Patent No.: US 10,341,250 B2
(45) Date of Patent: Jul. 2, 2019

(54) DEVICE BASED AUTOMATIC NETWORK PROVISIONING

(71) Applicant: Accenture Global Solutions Limited, Dublin (IE)

(72) Inventors: Pietro Caminiti, Rome (IT); Paolo Trevisan, Rome (IT); Simone Catenacci, Rome (IT); Luca Tiberia, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 451 days.

(21) Appl. No.: 15/164,480

(22) Filed: May 25, 2016

(65) Prior Publication Data

US 2017/0346755 A1 Nov. 30, 2017

(51) Int. Cl.
*H04L 12/911* (2013.01)
*H04L 29/08* (2006.01)
(Continued)

(52) U.S. Cl.
CPC ............ *H04L 47/70* (2013.01); *G06F 9/5061* (2013.01); *H04L 41/0806* (2013.01);
(Continued)

(58) Field of Classification Search
CPC ... H04L 47/70; H04L 47/822; H04L 41/0806; H04L 41/0886; H04L 43/16;
(Continued)

(56) References Cited

U.S. PATENT DOCUMENTS

| 9,112,841 B1 | 8/2015 | Brandwine et al. |
| 9,154,589 B1 | 10/2015 | Klein et al. |

(Continued)

FOREIGN PATENT DOCUMENTS

| EP | 2 381 363 A2 | 10/2011 |
| EP | 2 849 064 A1 | 3/2015 |

OTHER PUBLICATIONS

European Search Report corresponding to EP 17165159.9 dated Oct. 10, 2017, 13 pages.

(Continued)

*Primary Examiner* — Chirag R Patel
*Assistant Examiner* — Marshall M McLeod
(74) *Attorney, Agent, or Firm* — Harrity & Harrity, LLP

(57) ABSTRACT

A device may provide, to a first party, a user interface including information identifying one or more types of network functionalities for implementation, by a second party, in a network implementation. The user interface may be associated with receiving a selection of a configuration for the network implementation. The device may detect an interaction with the user interface associated with selecting the configuration for the network implementation. The configuration for the network implementation may indicate integration of a set of third party network functionalities associated with a set of third parties. The device may automatically provision a set of computing resources for the network implementation based on the configuration for the network implementation. The device may provide, to the first party, access to the network implementation based on automatically provisioning the set of computing resources.

20 Claims, 8 Drawing Sheets

(51) Int. Cl.
*H04L 12/24* (2006.01)
*H04L 12/26* (2006.01)
*G06F 9/50* (2006.01)
*H04W 88/02* (2009.01)

(52) U.S. Cl.
CPC ...... *H04L 41/0886* (2013.01); *H04L 43/0876* (2013.01); *H04L 47/822* (2013.01); *H04L 67/10* (2013.01); *H04L 67/2809* (2013.01); *H04L 67/2838* (2013.01); *H04L 43/16* (2013.01); *H04W 88/02* (2013.01)

(58) Field of Classification Search
CPC . H04L 43/0876; H04L 67/10; H04L 67/2809; H04L 67/2838; G06F 9/5061
USPC ............................ 709/220, 223, 224, 226
See application file for complete search history.

(56) References Cited

U.S. PATENT DOCUMENTS

| | | |
|---|---|---|
| 2001/0043571 A1 | 11/2001 | Jang et al. |
| 2012/0147894 A1 | 6/2012 | Mulligan et al. |
| 2013/0238788 A1* | 9/2013 | Caminiti ............. H04L 43/0876 709/224 |
| 2014/0317293 A1* | 10/2014 | Shatzkamer ............ G06F 9/455 709/226 |
| 2015/0066560 A1 | 3/2015 | Madani et al. |
| 2015/0288541 A1 | 10/2015 | Fargano et al. |
| 2015/0288767 A1* | 10/2015 | Fargano ................. H04L 43/08 709/227 |
| 2016/0043967 A1 | 2/2016 | Jacob et al. |
| 2016/0072920 A1 | 3/2016 | Kramer et al. |

OTHER PUBLICATIONS

Mijumbi Rashid et al., "Network Function Virtulization: State-of-the-Art and Research Challenges", vol. 18, No. 1, pp. 236-262, XP011597193.

ETSI, "ETSI GS NFV 002 V1.1.1: Network Functions Virtualisation (NFV); Architectural Framework," http://www.etsi.org/deliver/etsi_gs/nfv/001_099/002/01.01.01_60/gs_nfv002v010101p.pdf, Oct. 2013, 21 pages.

* cited by examiner

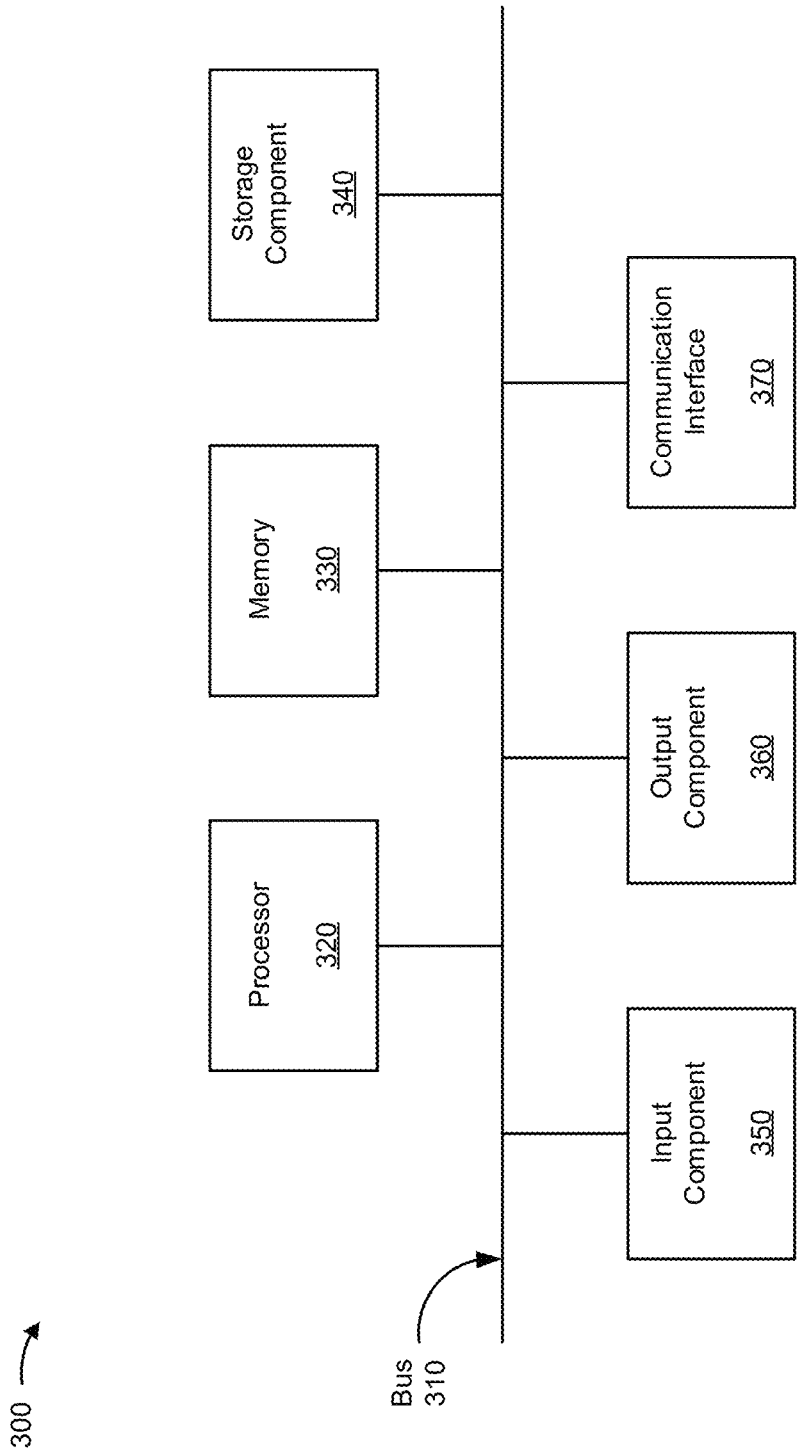

DEVICE BASED AUTOMATIC NETWORK PROVISIONING

BACKGROUND

A network implementation may be established for a set of users. For example, a network operator may install a set of network devices for the set of users to permit the set of users to access a network. The set of network devices may include a routing device, a gateway device, a firewall device, a data storage device, or the like. A network operator may configure the set of network devices to provide one or more network functionalities. For example, the network operator may establish a network address translation functionality, a firewall functionality, an intrusion detection functionality, a domain name server functionality, a virtual private network functionality, or the like.

SUMMARY

According to some possible implementations, a device may include one or more processors. The one or more processors may provide, to a first party, a user interface including information identifying one or more types of network functionalities for implementation, by a second party, in a network implementation. The user interface may be associated with receiving a selection of a configuration for the network implementation. The one or more processors may detect an interaction with the user interface associated with selecting the configuration for the network implementation. The configuration for the network implementation may indicate integration of a set of third party network functionalities associated with a set of third parties. The one or more processors may automatically provision a set of computing resources for the network implementation based on the configuration for the network implementation. The one or more processors may provide, to the first party, access to the network implementation based on automatically provisioning the set of computing resources.

According to some possible implementations, a non-transitory computer-readable medium may store one or more instructions. The one or more instructions, when executed by one or more processors, may cause the one or more processors to provide a user interface for display via a client device. The client device may be utilized by a first party. The one or more instructions, when executed by one or more processors, may cause the one or more processors to receive, based on providing the user interface, information associated with identifying a configuration for a network implementation for implementation by a second party. The network implementation may include one or more network functionalities associated with a third party. The one or more instructions, when executed by one or more processors, may cause the one or more processors to provision a set of computing resources for the network implementation based on the information associated with identifying the configuration for the network implementation. The set of computing resources may include first computing resources of the second party and second computing resources of the third party. The one or more instructions, when executed by one or more processors, may cause the one or more processors to provide, to the first party, access to the network implementation after provisioning the set of computing resources.

According to some possible implementations, a method may include providing, by a device and to a first party, a user interface including information identifying a set of network functionalities for implementation by a second party. The method may include receiving, by the device, a selection of a particular network functionality, of the set of network functionalities, based on providing the user interface. The method may include provisioning, by the device, a set of computing resources for a network implementation including the particular network functionality based on receiving the selection of the particular network functionality. The set of computing resources may include a first subset of computing resources relating to the second party and a second subset of computing resources relating to a third party. The method may include providing, by the device, access to the network implementation based on provisioning the set of computing resources.

BRIEF DESCRIPTION OF THE DRAWINGS

FIG. 3 is a diagram of example components of one or more devices of FIGS. 2A and 2B;

DETAILED DESCRIPTION

The following detailed description of example implementations refers to the accompanying drawings. The same reference numbers in different drawings may identify the same or similar elements.

A network implementation may be installed by a network operator for a group of users to provide one or more network functionalities for the group of users. For example, a set of network devices may be installed at one or more working locations to provide a video-conferencing functionality, a firewall functionality, a load balancing functionality, or the like. The network operator may deploy installation personnel to configure the set of network devices to provide the one or more network functionalities. The network operator may deploy installation personnel to reconfigure the set of network devices or install a different set of network devices to add a network functionality, remove a network functionality, or alter a network functionality.

However, deploying installation personnel to multiple locations to install network devices may be time-consuming and expensive as a quantity of locations increases. Moreover, delays in configuring one or more network functionalities or reconfiguring one or more network functionalities, resulting from deploying installation personnel to the multiple locations, may result in poor network performance for users of a network implementation. Implementations, described herein, may automatically provision a network implementation for a group of users. In this way, network functionalities may be configured or reconfigured on an as needed basis resulting in improved network performance and scalability and reduced cost relative to manual setup of a network implementation.

Figure 1:
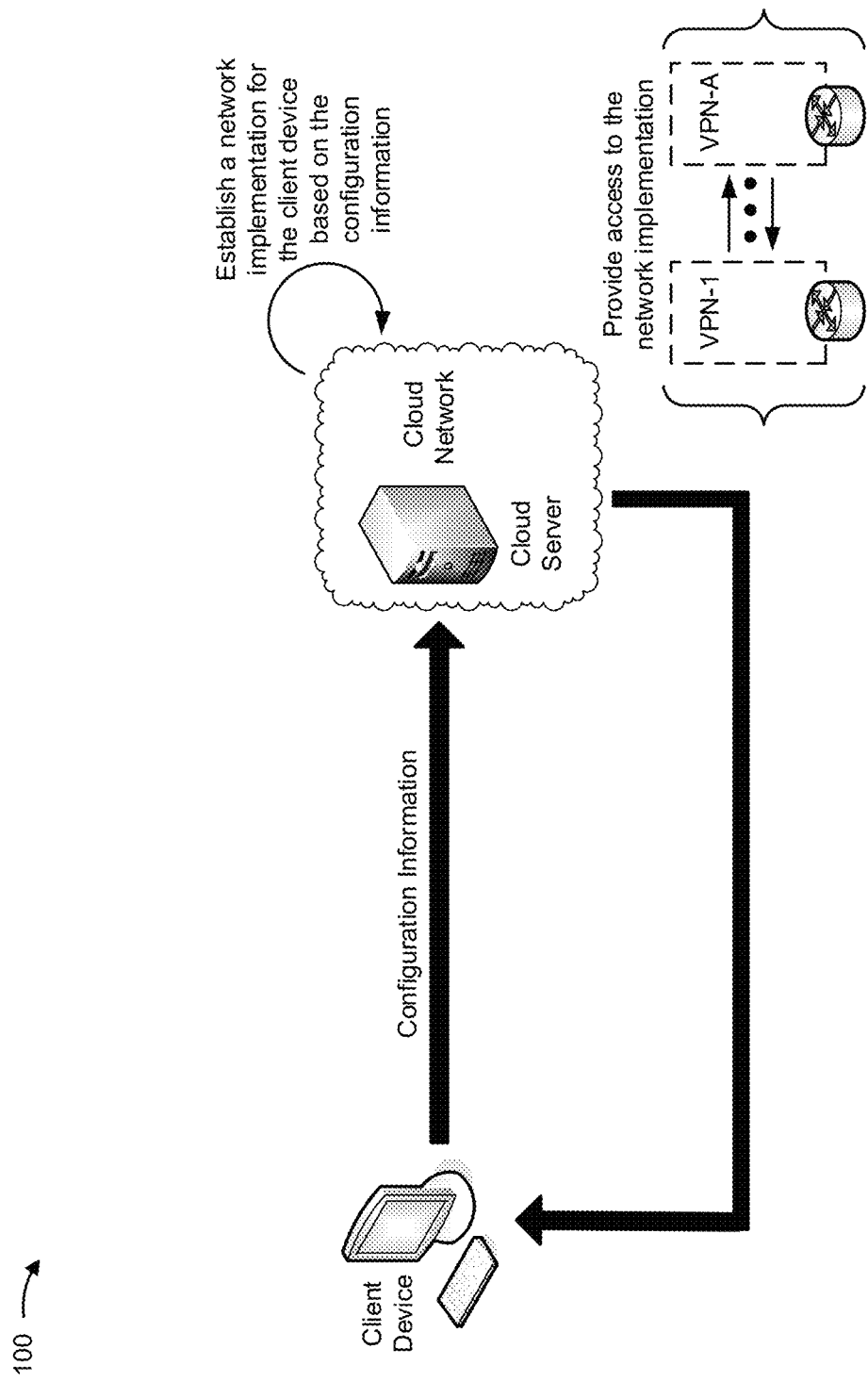
FIG. 1 is a diagram of an overview of an example implementation described herein.

FIG. 1 is a diagram of an overview of an example implementation 100 described herein. As shown in FIG. 1, example implementation 100 may include a client device and a cloud network, which includes a cloud server.

As further shown in FIG. 1, the cloud server (e.g., a first party) may receive configuration information from the client device (e.g., a second party). For example, the cloud server may generate a user interface for the client device, and may detect a user interaction with the user interface associated with indicating configuration information relating to a network implementation, such as information identifying a type of network implementation, a type of network functionality, or the like. The user interface may include information identifying one or more types of network functionalities, such as a virtual private network (VPN) network functionality, a virtualized load balancing network functionality, a virtualized intrusion detection functionality, or the like. A particular network functionality, of the one or more network functionalities, may be associated with a third party, such as a telecommunications provider, a vendor, or the like.

In another example, the cloud server may automatically determine the configuration information. For example, the cloud server may identify a user of the client device, and may obtain stored configuration information relating to one or more other network implementations previously established for the user of the client device. In another example, the cloud server may obtain information identifying one or more user preferences (e.g., a quality of service preference or a cost preference for a network implementation), and may determine configuration information based on the one or more preferences.

The cloud server may determine one or more parameters of a network implementation that is to be established for the client device based on the configuration information. For example, the cloud server may identify a type of network implementation, a type of network functionality for the network implementation, a quality of service for the network implementation, or the like. The cloud server may perform a transaction based on the configuration information. For example, the cloud server may determine a cost for a user of the client device based on the configuration information (e.g., a cost for establishing the network implementation, a cost associated with a particular quality of service, or a cost associated with a particular functionality), and may automatically perform a transaction for the cost.

As further shown in FIG. 1, based on the configuration information, the cloud server may establish the network implementation for the client device. For example, the cloud server may establish a set of VPN instances (e.g., VPN-1 through VPN-A) that are to be utilized by the client device (and/or one or more other client devices) to provide a VPN service for the client device. In this case, the cloud server may cause one or more computing resources (e.g., virtualized computing resources or physical computing resources) to be automatically allocated for the network implementation, such as allocating a quantity of processing resources, a quantity of network resources, a quantity of bandwidth, or the like, to provision the set of VPN instances. Additionally, or alternatively, the cloud server may cause a particular functionality to be performed (e.g., by a computing resource). For example, the cloud server may cause one or more computing resources of the cloud network to be allocated to perform a firewall functionality, a packet filtering functionality, a load balancing functionality, or the like.

In some implementations, the cloud server may cause one or more computing resources of the cloud network to be provisioned for the network implementation. For example, the cloud server may cause a processing resource to be assigned to provide a packet filtering functionality. In some implementations, the cloud server may cause one or more other computing resources to be provisioned for the network implementation. For example, the cloud server may cause a computing resource associated with a third party (e.g., a network bandwidth resource or a processing resource) to be allocated to integrate a network functionality associated with the third party into the network implementation.

The cloud server may provide, to the client device, access to the network implementation. For example, the cloud server may cause a user interface, provided via the client device, to include information associated with the network implementation, such as information identifying computing resources of the network implementation, a video call being performed via the network implementation, a collaboration environment being hosted via the network implementation (e.g., a document collaboration environment), or the like.

In this way, the cloud server automatically configures a network implementation for a client device, thereby improving network performance for the client device relative to the client device being required to wait until a network operator deploys installation personnel to alter and/or establish a network implementation.

As indicated above, FIG. 1 is provided merely as an example. Other examples are possible and may differ from what was described with regard to FIG. 1.

Figure 2A:
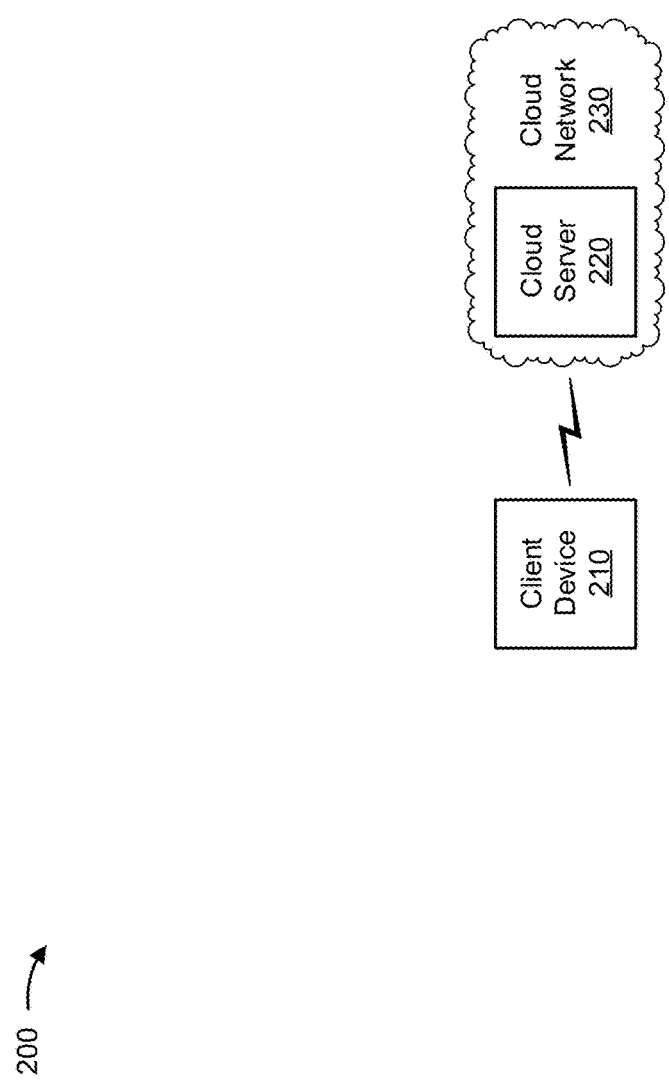
FIGS. 2A and 2B are diagrams of an example environment in which systems and/or methods, described herein, may be implemented.
Figure 2B:
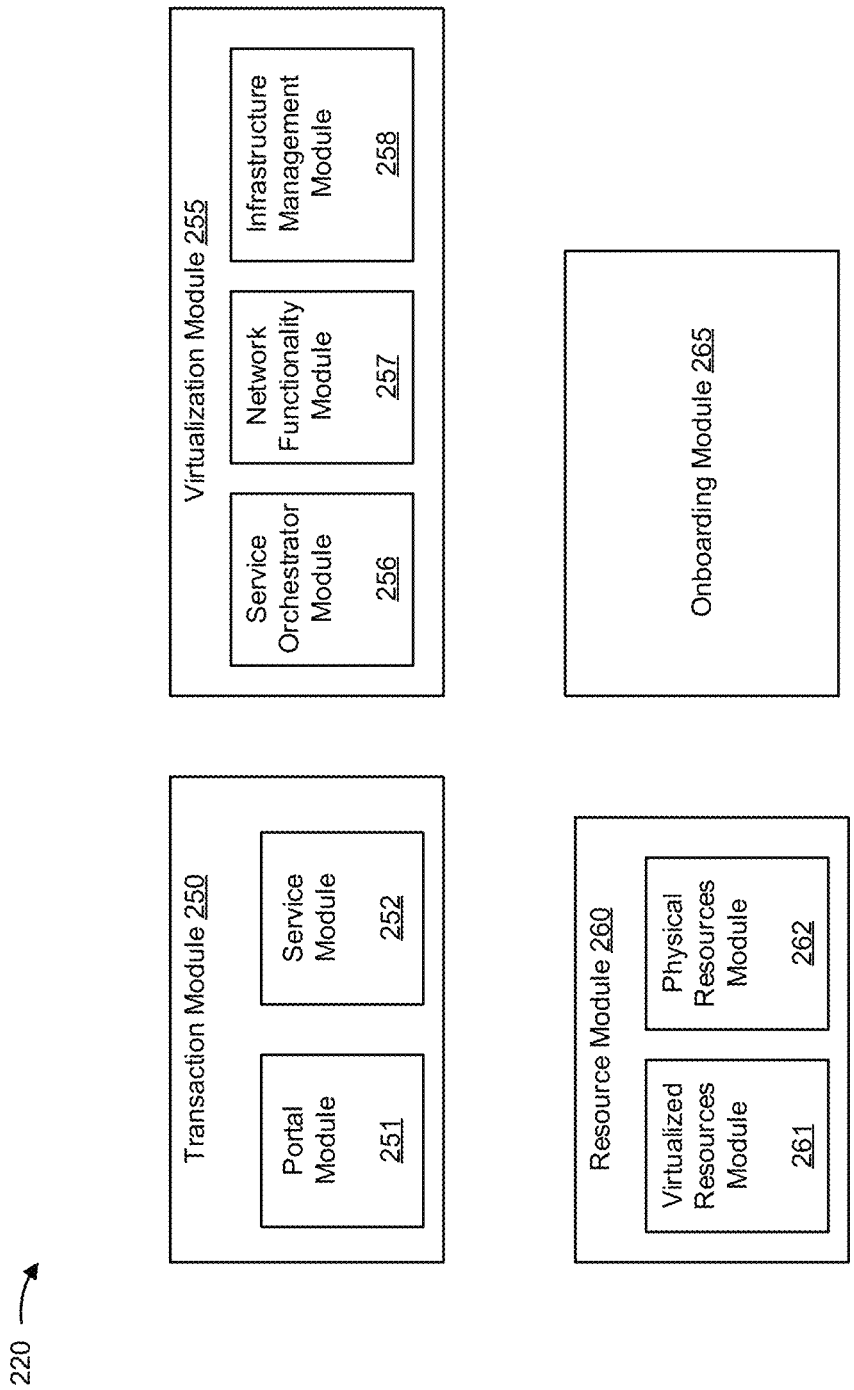

FIGS. 2A and 2B are diagrams of an example environment 200 in which systems and/or methods, described herein, may be implemented. As shown in FIG. 2A, environment 200 may include a client device 210, a cloud server 220, and a cloud network 230. Devices of environment 200 may interconnect via wired connections, wireless connections, or a combination of wired and wireless connections.

Client device 210 includes one or more devices capable of receiving, generating, storing, processing, and/or providing information associated with a network implementation. For example, client device 210 may include a communication and/or computing device, such as a mobile phone (e.g., a smart phone or a radiotelephone), a computer (e.g., a laptop computer, a tablet computer, a handheld computer, or a desktop computer), a wearable communication device (e.g., a smart wristwatch or a pair of smart eyeglasses), or a similar type of device. In some implementations, client device 210 may provide, for display, a user interface associated with a network implementation. In some implementations, client device 210 may receive information from and/or transmit information to another device in environment 200.

Cloud server 220 includes one or more devices capable of storing, processing, and/or routing information associated with a network implementation. For example, cloud server 220 may include a server that is associated with assigning resources of cloud network 230, directing functionalities of cloud network 230, or the like. In some implementations, cloud server 220 may include a communication interface that allows cloud server 220 to receive information from and/or transmit information to other devices in environment 200. Cloud server 220 is described herein, in detail, with regard to FIG. 2B. While cloud server 220 is described as a resource in a cloud computing network, such as cloud network 230, cloud server 220 may operate external to a cloud computing network, in some implementations.

Cloud network 230 includes an environment that delivers computing as a service, whereby shared resources, services, etc. may be provided by cloud server 220 to store, process, and/or route information associated with a network implementation. Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with client device 210 via one or more wired or wireless networks.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

FIG. 2B is a diagram of example modules of cloud server 220. As shown in FIG. 2B, cloud server 220 may include a transaction module 250 (e.g., which may include a portal module 251 and a service module 252), a virtualization module 255 (e.g., which may include a service orchestrator module 256, a network functionality module 257, and an infrastructure management module 258), a resource module 260 (e.g., which may include a virtualized resources module 261 and a physical resources module 262), and an onboarding module 265.

Transaction module 250 operates on one or more computing resources and is associated with providing information regarding a transaction. For example, transaction module 250 may provide information regarding a type of network implementation, a network functionality, or the like. In this case, cloud server 220 may perform a transaction for a user of client device 210 relating to a particular network implementation, a particular network functionality, or the like. In some implementations, transaction module 250 may provide a user interface including information. In some implementations, transaction module 250 may receive one or more application programming interface (API) calls associated with requesting information, performing a transaction, or the like. In some implementations, transaction module 250 may include portal module 251 and/or service module 252.

Portal module 251 operates on one or more computing resources and is associated with providing information regarding a transaction. For example, portal module 251 may provide information relating to a transaction for a network implementation. In some implementations, portal module 251 may include a set of submodules, such as a customer interface submodule, a service provider interface submodule, and a third party interface submodule, or the like. For example, portal module 251 may utilize the customer interface submodule to provide a user interface including information regarding a catalog (e.g., information identifying available types of network implementations or types of network functionalities), an order (e.g., one or more user interface elements for providing transaction information or viewing an order status), a price quote (e.g., information identifying an estimated cost), or the like. Similarly, portal module 251 may utilize the service provider interface submodule to provide a user interface including information regarding a partner catalog (e.g., an available third party network functionality), a partner order, a partner price quote, or the like. Similarly, portal module 251 may utilize the third party interface submodule to permit a third party to alter information that is provided based on the service provider interface submodule, such as by requesting an alteration relating to adding an available third party network functionality, altering a price of a third party network functionality, or the like.

Service module 252 operates on one or more computing resources and is associated with providing information regarding a transaction. For example, service module 252 may provide information identifying a cloud network service (e.g., a computing service), a legacy network service (e.g., integration with a legacy network, such as a public switched telephone network), or the like.

Virtualization module 255 operates on one or more computing resources and is assigned to manage a network implementation. For example, virtualization module 255 may cause a network implementation to be provisioned, a network functionality to be performed, an error management functionality to be performed, or the like. In some implementations, virtualization module 255 may include service orchestrator module 256, network functionality module 257, and/or infrastructure management module 258.

Service orchestrator module 256 operates on one or more computing resources assigned to establish a network implementation. For example, service orchestrator module 256 may receive a request for an order, process a transaction relating to the request, select a network implementation to establish based on the order, and establish the network implementation. In some implementations, service orchestrator module 256 may include a set of submodules, such as an order management submodule, a catalog management submodule, a service orchestration submodule, an integration layer submodule, or the like. For example, service orchestrator module 256 may utilize the order management submodule to process requests for transactions relating to establishing a network implementation, and to transfer information to portal module 251 for inclusion in a user interface. Similarly, service orchestrator module 256 may utilize the catalog management submodule to alter information that is provided via a catalog (e.g., information identifying a type of network implementation that may be established), and may transmit information to portal module 251 to alter a user interface including the catalog.

Similarly, service orchestrator module 256 may utilize the service orchestration submodule to provision a network implementation (e.g., assign computing resources to be utilized for the network implementation), to configure a network functionality, to manage a network implementation, or the like. Similarly, service orchestrator module 256 may utilize the integration layer submodule to perform API calls associated with a third party to cause the third party to provide a particular network functionality for a network implementation. In some implementations, service orchestrator module 256 may monitor utilization of computing resources of a network implementation, determine that the utilization satisfies a threshold utilization, and cause network resources to be reallocated to based on determining that the utilization satisfies the threshold utilization. In this way, service orchestrator module 256 dynamically scales resource allocation for a network implementation.

Network functionality module 257 operates on one or more computing resources to manage a network functionality of a network implementation. For example, network functionality module 257 may operate on a computing resource that provides an auto-healing functionality, a fault management functionality, or the like for a network implementation and/or a network functionality associated with the network implementation. In some implementations, network functionality module 257 may include a lifecycle management submodule, an auto-healing submodule, a configuration submodule, or the like. For example, network functionality module 257 may utilize the lifecycle management submodule to manage a lifecycle of a network implementation (e.g., to monitor utilization of the network implementation or remove the network implementation). Similarly, network functionality module 257 may utilize the auto-healing submodule to detect an error with a network implementation (e.g., a service interruption), and identify computing resources to reassign to the network implementation to remediate the error. Similarly, network functionality module 257 may utilize the configuration submodule to configure one or more network devices (e.g., of cloud network 230) for a network implementation. In some implementations, network functionality module 257 operates on one or more computing resources associated with a third party. For example, network functionality module 257 may case a third party network device to be configured, a third party computing resource to be allocated, or the like.

Infrastructure management module 258 operates on one or more computing resources to manage cloud network 230 for a group of network implementations. For example, infrastructure management module 258 may operate on a computing resource to automatically administer cloud network 230. In some implementations, infrastructure management module 258 may include a set of submodules, such as a resource allocation submodule, a metering submodule, a group of management submodules, or the like. For example, infrastructure management module 258 may utilize the resource allocation submodule to dynamically reallocate resources of cloud network 230 (e.g., cloud server 220) to manage a user interface to perform transactions, to provide access to a set of network implementations, or the like, Similarly, infrastructure management module 258 may utilize the metering submodule to meter usage of cloud network 230 or a third party computing resource, and provide transaction information relating to usage of cloud network 230, thereby permitting charging a user of client device 210 on a usage basis for the particular network implementation (e.g., a time-usage basis or a network traffic-usage basis). Similarly, infrastructure management module 258 may utilize the group of management submodules to manage computing resources (e.g., to determine a status of computing resources, to identify computing resources for dynamic reassignment, or to configure a computing resource), such as a data storage resource, a network resource, a computation resource, a multitenancy software resource, a processor resource, or the like.

Resource module 260 includes one or more assignable computing resources of cloud server 220 and/or cloud network 230. For example, cloud server 220 may utilize one or more other modules of cloud server 220 to allocate virtualized resources of virtualized resources module 261 (e.g., cloud computing resources or virtualized network routing resources) and/or physical resources of physical resources module 262 (e.g., backend computing resources or physical routing resources).

Onboarding module 265 operates on one or more computing resources and is associated with providing a particular service via a network implementation. For example, cloud server 220 may cause onboarding module 265 to provide a video-conferencing service, a firewall service, or the like via the network implementation, and onboarding module 265 may perform one or more processing functionalities associated with providing the service, such as performing video processing for the video-conferencing service, packet analysis for the firewall service, or the like.

The number and arrangement of modules shown in FIG. 2B is provided as an example. In practice, there may be additional modules, fewer modules, different modules, or differently arranged modules than those shown in FIG. 2B. Furthermore, two or more modules shown in FIG. 2B may be implemented within a single module, or a single module shown in FIG. 2B may be implemented as multiple, distributed modules. Additionally, or alternatively, a set of modules of cloud server 220 may perform one or more functions described as being performed by another set of modules of cloud server 220. Additionally, or alternatively, a first cloud server 220 may include a first module that may interact with a second module of a second cloud server 220.

FIG. 3 is a diagram of example components of a device 300. Device 300 may correspond to client device 210 and/or cloud server 220. In some implementations, client device 210 and/or cloud server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
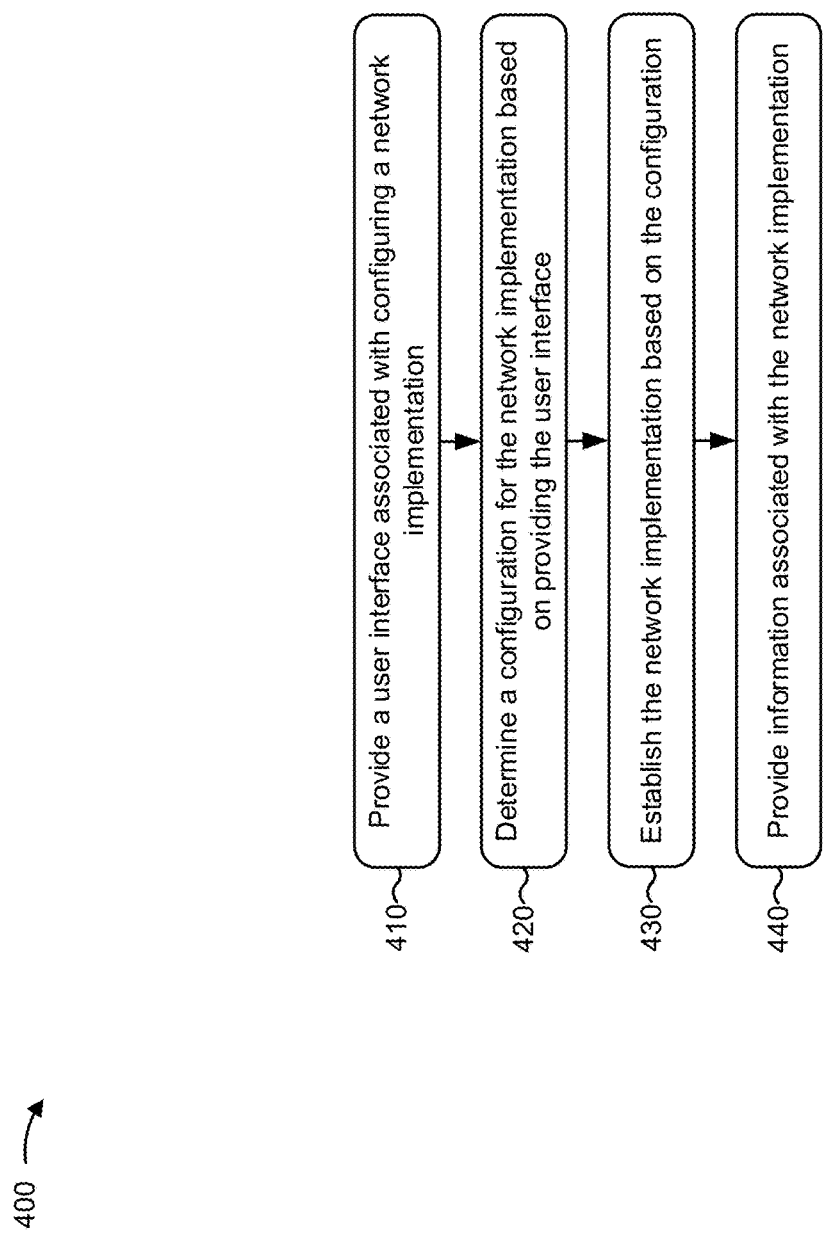
FIG. 4 is a flow chart of an example process for automatically provisioning a network implementation.

FIG. 4 is a flow chart of an example process 400 for automatically provisioning a network implementation. In some implementations, one or more process blocks of FIG. 4 may be performed by cloud server 220. In some implementations, one or more process blocks of FIG. 4 may be performed by another device or a group of devices separate from or including cloud server 220, such as client device 210.

As shown in FIG. 4, process 400 may include providing a user interface associated with configuring a network implementation (block 410). For example, cloud server 220 may provide the user interface associated with configuring the network implementation. The network implementation may include a set of network functionalities, such as a network address translation functionality, a firewall functionality, an intrusion detection functionality, a domain name server functionality, or the like. For example, cloud server 220 may provide one or more user interface elements identifying the one or more network functionalities, and may detect a user interaction with the user interface associated with selecting a particular network functionality that is to be provided via a virtualization of cloud network 130 (e.g., via assigning computing resources to provide the network functionality as a service of the network implementation).

Additionally, or alternatively, cloud server 220 may provide a user interface identifying one or more parameters associated with the network implementation. For example, cloud server 220 may identify one or more quality of service levels, one or more network bandwidth levels, or the like. In this case, cloud server 220 may detect a user interaction with the user interface associated with selecting a particular parameter. Additionally, or alternatively, cloud server 220 may provide a user interface identifying one or more types of network implementations. For example, cloud server 220 may provide information identifying a video-conferencing type of network implementation (e.g., that provides a video-conferencing service), a VPN type of network implementation, a file transfer protocol (FTP) server type of network implementation, a sales portal type of network implementation, or the like. In this case, cloud server 220 may detect a user interaction with the user interface associated with selecting a particular type of network implementation that is to be provided. Additionally, or alternatively, cloud server 220 may provide a user interface with which to receive transaction information, such as a cost of a particular type of network implementation or network functionality, and may detect a user interaction with the user interface associated with specifying information relating to a transaction, such as a credit card number, an account number, or the like. In this case, cloud server 220 may perform a transaction with a third party for a first party (e.g., a user of client device 210) to cause the network implementation to be established.

In some implementations, cloud server 220 may provide a user interface associated with determining one or more user preferences. For example, cloud server 220 may generate a questionnaire relating to a set of user preferences regarding a network implementation. In this case, based on a response to the questionnaire, cloud server 220 may automatically determine a configuration for the network implementation. In some implementations, cloud server 220 may provide a user interface associated with identifying a user. For example, cloud server 220 may provide a secure login user interface with which to receive a user identifier, a user password, or the like. In this case, based on identifying client device 210 or the user of client device 210, cloud server 220 may automatically identify a configuration for the network implementation.

In some implementations, cloud server 220 may provide a user interface associated with receiving information from a third party (e.g., a vendor, a telecommunications provider, or a cloud service provider). For example, cloud server 220 may provide a user interface with which the third party can alter one or more offered third party network functionalities, alter a price of a network functionality, or the like. In this case, cloud server 220 may alter a user interface that is provided to a first party based on information received based on providing the user interface to the third party. Additionally, or alternatively, cloud server 220 may receive one or more application programming interface (API) calls associated with altering an offered third party network functionality or the like.

As further shown in FIG. 4, process 400 may include determining a configuration for the network implementation based on providing the user interface (block 420). For example, cloud server 220 may determine the configuration for the network implementation based on providing the user interface. In some implementations, cloud server 220 may determine the configuration based on detecting an interaction with the user interface. For example, cloud server 220 may detect an interaction with a portion of the user interface associated with selecting a particular parameter for the network implementation, such as a type of network implementation, a quality of service associated with the network implementation, a network functionality that is to be provided for the network implementation, or the like. Additionally, or alternatively, cloud server 220 may determine the configuration based on information identifying a user. For example, cloud server 220 may receive information identifying the user via the user interface, and may obtain stored information identifying a configuration for a previous network implementation established for the user.

As further shown in FIG. 4, process 400 may include establishing the network implementation based on the configuration (block 430). For example, cloud server 220 may establish the network implementation based on the configuration. In some implementations, cloud server 220 may assign computing resources to receiving information from, processing information for, and/or transmitting information to a particular set of client devices 210 based on the configuration for the network implementation. For example, based on determining the configuration for the network implementation, cloud server 220 may determine that the particular set of client devices 210 are to utilize the network implementation, and may assign a particular quantity of computing resources to receive information from, process information for, and/or provide information to the particular set of client devices 210. In some implementations, cloud server 220 may assign computing resources to perform a particular network functionality of the network implementation based on the configuration. For example, cloud server 220 may determine, based on the configuration, that the network implementation is to include a firewall functionality, and may assign a particular quantity of computing resources for performing the firewall functionality.

In some implementations, cloud server 220 may assign a particular amount of bandwidth to the network implementation based on the configuration. For example, cloud server 220 may determine, based on the configuration, that a particular quality of service is to be provided to a set of client devices 210 utilizing the network configuration, and may assign the particular amount of bandwidth to cause the particular quality of service to be provided.

In some implementations, cloud server 220 may cause a third party network functionality to be provided for client device 210 based on the configuration for the network implementation. For example, cloud server 220 may determine that a third party network functionality, such as a packet filtering functionality, a routing functionality, or the like, is to be provided for the network implementation, and may cause a server (or another network device) associated with the third party network functionality to provide the third party network functionality. In some implementations, cloud server 220 may cause multiple third party network functionalities to be integrated into the network functionality. For example, cloud server 220 may provision a first set of computing resources for a first operations support system (OSS) and/or a first business support system (BSS) (e.g., of a telecommunications provider) and a second set of computing resources for a second OSS and/or a second BSS. In this way, cloud server 220 utilizes a single user interface to provision a network implementation integrating multiple OSS's, multiple BSS's, or the like. Similarly, cloud server 220 may provision multiple sets of computing resources associated with multiple vendors.

In some implementations, cloud server 220 may provide account information for a user of client device 210 with a third party to cause the third party network functionality to be provided. For example, cloud server 220 may provide information identifying an account with a third party (e.g., a telecommunications provider or a cloud service provider) to cause the third party network functionality to be provided. Additionally, or alternatively, cloud server 220 may establish an account with the third party based on information identifying the user of client device 210.

As further shown in FIG. 4, process 400 may include providing information associated with the network implementation (block 440). For example, cloud server 220 may provide information associated with the network implementation. In some implementations, cloud server 220 may provide access to the network implementation. For example, cloud server 220 may provide a user interface with which to utilize the network implementation, such as a video-conferencing user interface, a VPN access user interface, or the like. Additionally, or alternatively, cloud server 220 may cause one or more network functionalities of the network implementation to be performed. For example, cloud server 220 may cause a load balancing functionality to be performed, and may provide information to client device 210 based on the load balancing functionality being performed. Similarly, cloud server 220 may cause an intrusion detection functionality to be performed, and may provide information to client device 210 identifying a detected intrusion, information indicating that an intrusion was prevented, or the like.

In some implementations, cloud server 220 may provide information associated with a third party. For example, cloud server 220 may generate a trouble ticket relating to an error with a third party network functionality (e.g., based on detecting the error or receiving information via a user interface identifying the error), and may transmit the trouble ticket to the third party to cause the third party to resolve the error. In some implementations, cloud server 220 may provide customer relationship management (CRM) information associated with the network implementation. For example, cloud server 220 may provide information relating to usage of the network implementation, satisfaction with the network implementation, or the like.

In some implementations, cloud server 220 may monitor utilization of the network implementation based on providing access to the network implementation. For example, cloud server 220 may receive a request to alter a computing resource allocation for the network implementation, and may cause the computing resource allocation to be altered based on the request. Similarly, cloud server 220 may detect a utilization of the network implementation, and may cause the computing resource allocation to be altered based on the detected utilization. For example, cloud server 220 may determine that a threshold quantity of client devices 210 are utilizing a video-conferencing service of the network implementation, and may increase a bandwidth allocation to maintain a class of service for the network implementation. In this way, cloud server 220 dynamically alters a network implementation to scale the network implementation based on a user need, a user requirement, or a user class of service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
FIGS. 5A-5C are diagrams of an example implementation relating to the example process shown in FIG. 4.
Figure 5B:
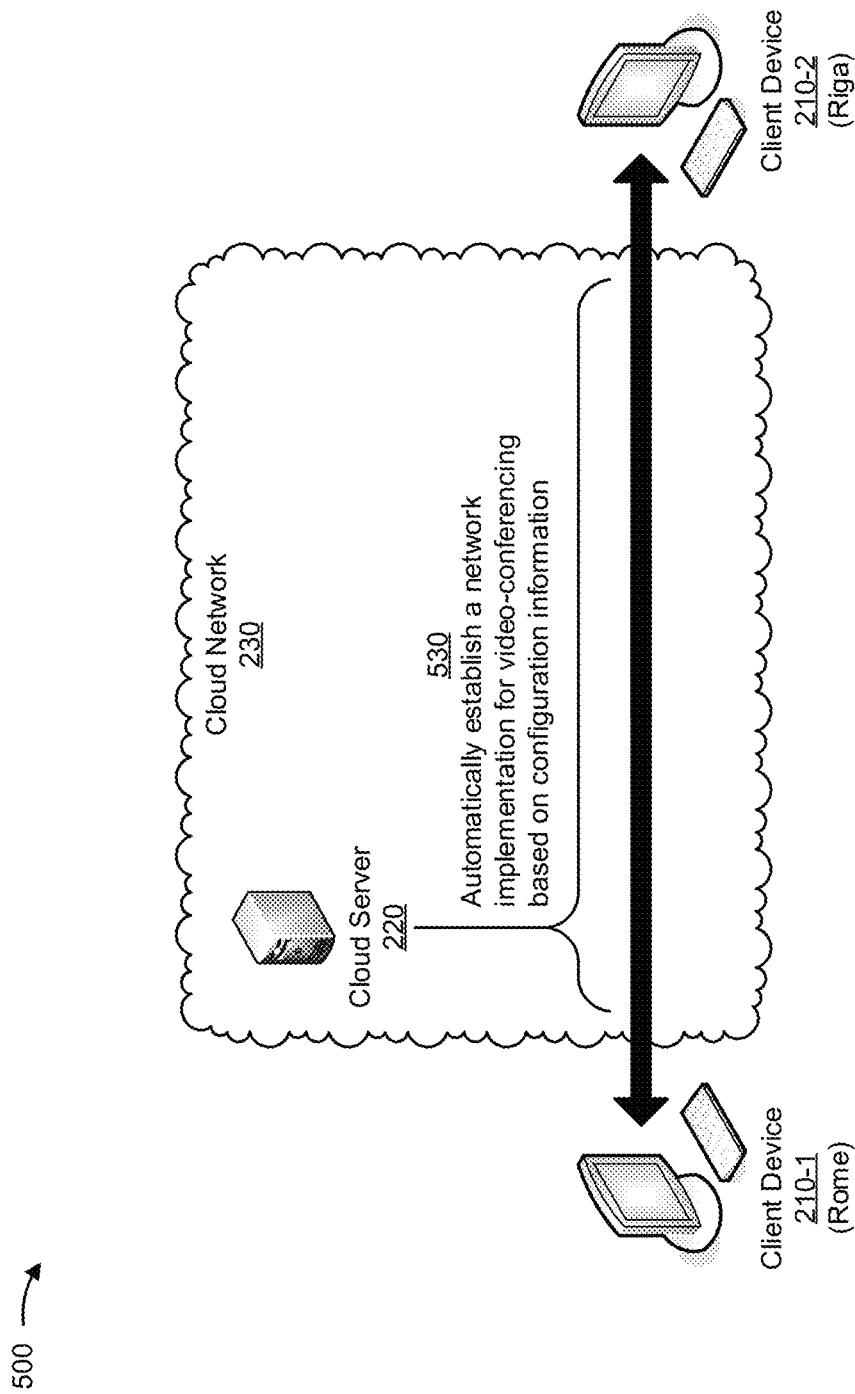
Figure 5C:
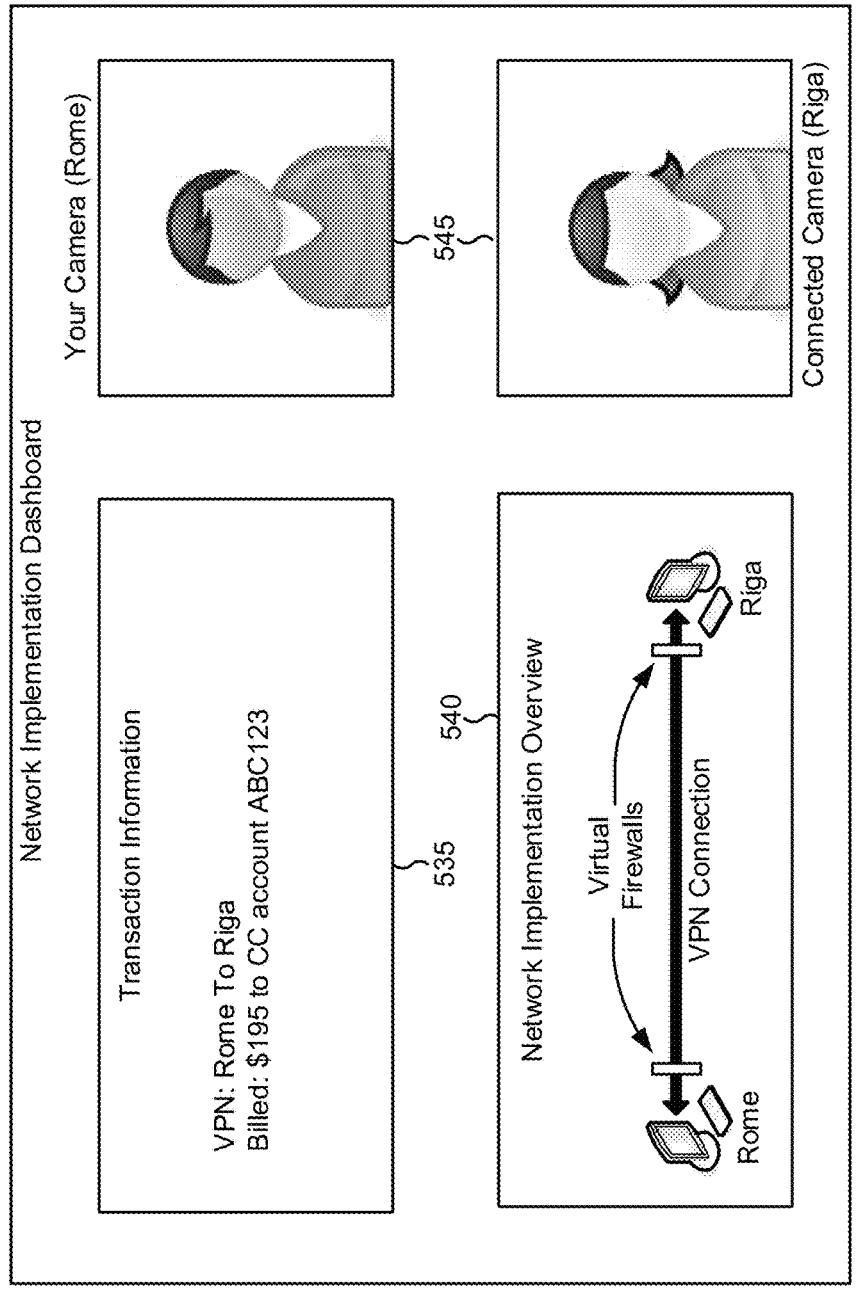

FIGS. 5A-5C are diagrams of an example implementation 500 relating to example process 400 shown in FIG. 4. FIGS. 5A-5C show an example of automatically provisioning a network implementation.

As shown in FIG. 5A, cloud server 220 provides, via client device 210, a configuration dashboard (e.g., a user interface) for determining a configuration of a network implementation. As shown by reference number 505, a type of network implementation is selected, Video-Conference, to cause cloud server 220 to establish a network implementation that permits video conferencing to be performed. As shown by reference number 510, cloud server 220 receives a selection of a particular class of service, Gold (e.g., corresponding to a particular data priority for network traffic associated with the network implementation). As shown by reference number 515, cloud server 220 receives an indication of locations at which client devices 210 are located for the video-conference (e.g., Rome and Riga). As shown by reference number 520, based on the type of network implementation and the class of service, cloud server 220 identifies a bandwidth that is to be provided for the network implementation to provide the class of service (e.g., 50 MBPS (megabits per second)). As shown by reference number 525, cloud server 220 receives a selection of a network functionality that is to be provided for the network implementation (e.g., a virtual firewall network functionality).

As shown in FIG. 5B, cloud server 220 automatically establishes the network implementation to provide video-conferencing for client device 210-1 (e.g., located in Rome) and client device 210-2 (e.g., located in Riga). For example, cloud server 220 assigns a set of computing resources and bandwidth to permit video-conferencing to occur, and activates a virtual network firewall network functionality to provide data security for the network implementation. In this case, cloud server 220 may exchange information with a third party backend (e.g., a telecommunications provider backend operating a network link between Rome and Riga) to cause the network bandwidth to be allocated for the network implementation.

As shown in FIG. 5C, cloud server 220 provides, via client device 210, a network implementation dashboard providing information regarding the network implementation. As shown by reference number 535, cloud server 220 provides transaction information regarding establishing the network implementation (e.g., a VPN for the Rome to Riga video-conference). As shown by reference number 540, cloud server 220 provides a visualization of the network implementation that is established for client devices 210-1 and 210-2. As shown by reference number 545, cloud server 220 provides the video-conference via the network implementation dashboard.

As indicated above, FIGS. 5A-5C are provided merely as an example. Other examples are possible and may differ from what was described with regard to FIGS. 5A-5C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, or a combination of related and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a first party, a user identifier identifying the first party;
provide, to the first party, a user interface including information identifying one or more types of network functionalities for implementation, by a second party, in a network implementation,
the user interface being associated with a configuration automatically identified based on the user identifier identifying the first party, and
the user interface being associated with receiving a selection of the configuration for the network implementation;
detect an interaction with the user interface associated with selecting the configuration for the network implementation,
the configuration for the network implementation indicating integration of a set of third party network functionalities associated with a set of third parties;
automatically provision a set of computing resources for the network implementation based on the configuration for the network implementation,
the set of computing resources providing the set of third party network functionalities; and
provide, to the first party, access to the network implementation based on automatically provisioning the set of computing resources.

2. The device of claim 1, where the set of computing resources include a first subset of computing resources associated with the second party and a second subset of computing resources associated with the set of third parties.

3. The device of claim 2, where the one or more processors, when automatically provisioning the set of computing resources, are to:
provision a first one or more computing resources, of the second subset of computing resources, associated with a first operations support system (OSS) of a first telecommunications provider; and
provision a second one or more computing resources, of the second subset of computing resources, associated with a second OSS of a second telecommunications provider,
the second OSS being different from the first OSS.

4. The device of claim 2, where the second subset of computing resources associated with the set of third parties includes a first computing resource associated with a first vendor and a second computing resource associated with a second vendor.

5. The device of claim 2, where the one or more processors are further to:
receive a request to cause an alteration to the second subset of computing resources associated with the set of third parties; and
transmit information to cause the second subset of computing resources to be altered based on the request.

6. The device of claim 2, where a first computing resource, in the first subset of computing resources or the second subset of computing resources, is a virtualized computing resource, and
where a second computing resource, in the first subset of computing resources or the second subset of computing resources, is a physical computing resource.

7. The device of claim 1, where the one or more processors are further to:
transmit first information associated with the network implementation to a first business support system (BSS) associated with a first telecommunications provider; and
transmit second information associated with the network implementation to a second BSS associated with a second telecommunications provider,
the second BSS being different from the first BSS.

8. The device of claim 1, where the one or more processors, when automatically provisioning the set of computing resources, are to:
assign a portion of the set of computing resources to provide a video-conferencing service or a virtual private network service.

9. The device of claim 1, where the one or more processors are further to:
meter usage of the network implementation by the first party; and
perform a transaction with the first party based on metering usage of the network implementation by the first party.

10. A non-transitory computer-readable medium storing instructions, the instructions comprising:
one or more instructions that, when executed by one or more processors, cause the one or more processors to:
receive a user identifier identifying a first party;
provide a user interface for display via a client device, the client device being utilized by the first party, and the user interface being associated with a configuration automatically identified based on the user identifier identifying the first party;
receive, based on providing the user interface, information associated with identifying the configuration for a network implementation for implementation by a second party,
the network implementation including one or more network functionalities associated with a third party;
provision a set of computing resources for the network implementation based on the information associated with identifying the configuration for the network implementation,
the set of computing resources providing the one or more network functionalities associated with the third party, and
the set of computing resources including first computing resources of the second party and second computing resources of the third party; and
provide, to the first party, access to the network implementation after provisioning the set of computing resources.

11. The non-transitory computer-readable medium of claim 10, where the set of computing resources includes at least one of:
a physical computing resource, or
a virtualized computing resource.

12. The non-transitory computer-readable medium of claim 10, where the one or more instructions, when executed by the one or more processors, further cause the one or more processors to:
determine a set of network functionalities that are available for integration into the network implementation,
the set of network functionalities including the one or more network functionalities; and
where the one or more instructions, that cause the one or more processors to provide the user interface, cause the one or more processors to:
provide information identifying the set of network functionalities via the user interface based on determining the set of network functionalities.

13. The non-transitory computer-readable medium of claim 10, where the one or more instructions, when executed by the one or more processors, cause the one or more processors to:
receive, from the first party, transaction information relating to the network implementation; and
perform a transaction with the third party based on the transaction information received from the first party.

14. The non-transitory computer-readable medium of claim 10, where the one or more instructions, that cause the one or more processors to provide access to the network implementation, cause the one or more processors to:
provide another user interface for display via the client device,
the other user interface including a video-conferencing service relating to the network implementation.

15. The non-transitory computer-readable medium of claim 10, where the one or more instructions, that cause the one or more processors to provision the set of computing resources, cause the one or more processors to:
provision a plurality of computing resources associated with at least one of:
a plurality of types of networks,
a plurality of vendors,
a plurality of types of operations support systems, or
a plurality of types of business support systems.

16. The non-transitory computer-readable medium of claim 10, where the one or more instructions, when executed by the one or more processors, further cause the one or more processors to:
- monitor utilization of the network implementation; and
- reallocate one or more computing resources, of the set of computing resources, based on monitoring utilization of the network implementation.

17. A method, comprising:
- receiving, by a device and from a first party, a user identifier identifying the first party;
- providing, by the device and to the first party, a user interface including information identifying a set of network functionalities for implementation by a second party,
  - at least one network functionality of the set of network functionalities being automatically identified based on the user identifier identifying the first party;
- receiving, by the device, a selection of a particular network functionality, of the set of network functionalities, based on providing the user interface;
- provisioning, by the device, a set of computing resources for a network implementation including the particular network functionality based on receiving the selection of the particular network functionality,
  - the set of computing resources providing the particular network functionality, and
  - the set of computing resources including a first subset of computing resources relating to the second party and a second subset of computing resources relating to a third party; and
- providing, by the device, access to the network implementation based on provisioning the set of computing resources.

18. The method of claim 17, further comprising:
- determining that a utilization of the set of computing resources satisfies a threshold utilization; and
- altering an allocation of the set of computing resources based on determining that the utilization of the set of computing resources satisfies the threshold.

19. The method of claim 17, where provisioning the set of computing resources comprises:
- assigning one or more virtualized computing resources to the network implementation; and
- assigning one or more physical computing resources to the network implementation.

20. The method of claim 17, where provisioning the set of computing resources comprises:
- performing a set of application programming interface (API) calls relating to the third party to cause the second subset of computing resources to be provisioned for the first party.

* * * * *